(12) United States Patent
Hatano et al.

(10) Patent No.: US 7,673,145 B2
(45) Date of Patent: Mar. 2, 2010

(54) BIOMETRIC IMAGE COLLATION APPARATUS AND COLLATION METHOD THEREFOR

(75) Inventors: Takahiro Hatano, Kanagawa (JP); Satoshi Shigematsu, Kanagawa (JP); Hiroki Morimura, Kanagawa (JP); Namiko Ikeda, Kanagawa (JP); Yukio Okazaki, Kanagawa (JP); Katsuyuki Machida, Kanagawa (JP); Mamoru Nakanishi, Kanagawa (JP)

(73) Assignee: Nippon Telephone and Telegraph Corporation, Tokyo (JP)

( * ) Notice: Subject to any disclaimer, the term of this patent is extended or adjusted under 35 U.S.C. 154(b) by 1074 days.

(21) Appl. No.: 10/515,566

(22) PCT Filed: Mar. 5, 2004

(86) PCT No.: PCT/JP2004/002785

§ 371 (c)(1),
(2), (4) Date: Nov. 18, 2004

(87) PCT Pub. No.: WO2004/079658

PCT Pub. Date: Sep. 16, 2004

(65) Prior Publication Data

US 2005/0226467 A1    Oct. 13, 2005

(30) Foreign Application Priority Data

Mar. 7, 2003    (JP) .............................. 2003-061921

(51) Int. Cl.
*H04L 9/00* (2006.01)

(52) U.S. Cl. .......................................... 713/182; 726/5

(58) Field of Classification Search ................ 726/2–7, 726/9–10, 17–21, 27–30, 32; 713/161, 166–168, 713/170, 176, 182, 185–186, 189, 193; 709/212–214, 709/223–225, 227–228; 380/54, 217, 234, 380/268–269, 51; 705/57–59, 62, 67, 44, 705/405; 707/1–3, 6–7, 100–102, 104.1; 711/100–105, 111–112, 115, 128, 151, 163, 711/167, 171, 200, 205, 209, 212–214; 382/115–119, 382/129–130, 168–173, 181, 194, 203, 232; 358/1.1, 2.1, 3.01, 3.21–3.24, 3.28

See application file for complete search history.

(56) References Cited

U.S. PATENT DOCUMENTS

| | | | |
|---|---|---|---|
| 5,845,005 A | 12/1998 | Setlak et al. | |
| 5,909,514 A * | 6/1999 | Murayama et al. | 382/254 |
| 6,021,211 A * | 2/2000 | Setlak et al. | 382/124 |
| 6,067,369 A * | 5/2000 | Kamei | 382/125 |
| 6,201,886 B1 * | 3/2001 | Nakayama | 382/124 |
| 6,532,308 B1 * | 3/2003 | Goertzen | 382/240 |
| 6,731,779 B2 * | 5/2004 | Satoh | 382/124 |
| 6,823,009 B1 * | 11/2004 | Baina et al. | 375/240.12 |
| 6,895,104 B2 * | 5/2005 | Wendt et al. | 382/125 |
| 7,009,997 B2 * | 3/2006 | Huang et al. | 370/468 |
| 7,159,116 B2 * | 1/2007 | Moskowitz | 713/176 |
| 7,230,344 B2 * | 6/2007 | Pollack et al. | 290/40 C |

FOREIGN PATENT DOCUMENTS

| | | |
|---|---|---|
| EP | 1227429 A | 7/2002 |
| JP | 57-159362 A | 10/1982 |
| JP | 8-110949 | 4/1996 |
| JP | 08-129644 A | 5/1996 |
| JP | 08-263658 A | 10/1996 |
| JP | 2000-222556 A | 8/2000 |
| JP | 2002-222424 | 8/2002 |

OTHER PUBLICATIONS

Lin et al., "Fingerprint Image Enhancement: Algorithm and Performance Evaluation", IEEE Transactions on Pattern Analysis and Machine Intelligence, vol. 20, No. 8, Aug. 1998.
Prabhakar et al., "Minutia Verification and Classification for Fingerprint Matching", IEEE 2000.

Qinghan Xiao et al; "*Fingerprint Image Postprocessing: A Combined Statistical and Structural Approach*"; Pattern Recognition, Elsevier, Kidlington, GB,; vol. 24, No. 10; Jan. 1991; pp. 985-992.

Shen L-L et al; "*Quality Measures of Fingerprint Images*"; Lecture Notes in Computer Science, Springer Verlag, Berlin, DE,; vol. 2091; Jun. 6, 2001; pp. 266-271.

\* cited by examiner

*Primary Examiner*—Kimyen Vu
*Assistant Examiner*—Leynna T Truvan
(74) *Attorney, Agent, or Firm*—Blakely, Sokoloff, Taylor & Zafman LLP

(57) ABSTRACT

This invention includes an image quality priority level decision processing unit (40) which evaluates the magnitude of an image quality of each of a plurality of first image data formed from biometric images associated with the same target on the basis of a specific index having the relationship of a monotone function with authentication accuracy of biometric authentication, and outputs each of the first image data upon adding a priority level thereto on the basis of the evaluation result, a first image storage (6, 81) unit which stores each of the first image data having a priority level added thereto from the image quality priority level decision processing unit (40), a second image storage unit (8, 61) which stores second image data used for comparison/collation with the first image data, an image collation unit (7) which compares/collates the second image data stored in the second image storage unit (8, 61) with the first image data stored in the first image storage unit (6, 81) and outputs the comparison/collation result, and a control unit (9) which controls each of the units. The control unit (9) causes the image collation unit (7) to compare/collate the second image data stored in the second image storage unit (8, 61) with the first image data stored in the first image storage unit (6, 81) in accordance with the priority levels, and outputs the comparison/collation result from the image collation unit (7).

15 Claims, 9 Drawing Sheets

EXAMPLE OF FINGERPRINT IMAGE WITH IMAGE COLLAPSE

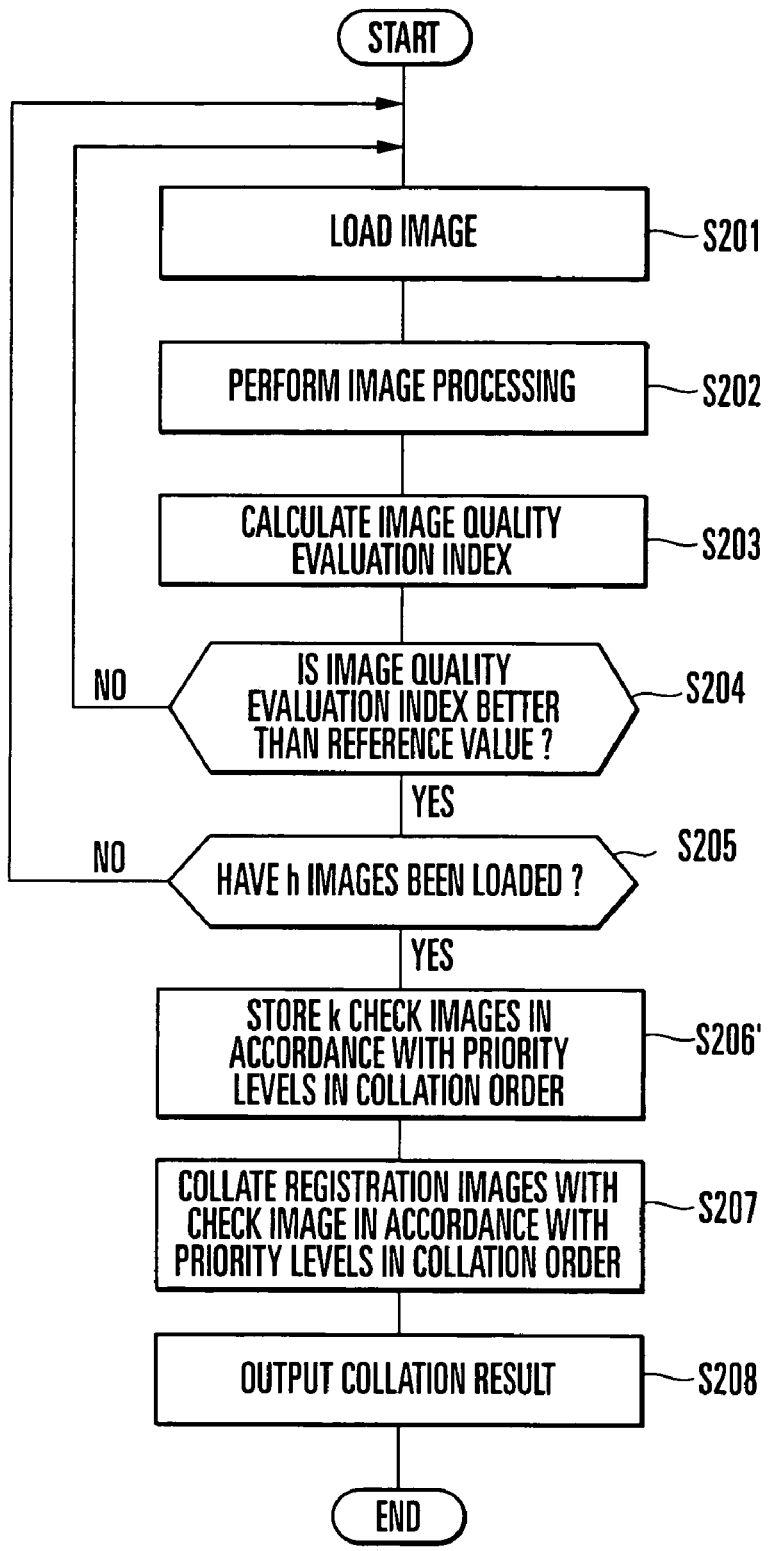
F I G. 8

EXAMPLE OF FINGERPRINT IMAGE WITH BLUR

BIOMETRIC IMAGE COLLATION APPARATUS AND COLLATION METHOD THEREFOR

TECHNICAL FIELD

The present invention relates to a biometric image collation apparatus and collation method therefor for biometric images such as fingerprints and irises used as authentication means.

BACKGROUND ART

Biometric images used as authentication means include fingerprints, irises, and the like. Take fingerprints as an example. The image data (check image) of an unknown fingerprint is compared/collated with the image data (registered image) of a fingerprint which is stored in a database or the like in advance and associated with a specific individual. If it is determined that they are identical to each other, this unknown fingerprint image belongs to the specific individual.

In this fingerprint authentication, the magnitude of quality of a fingerprint image greatly influences authentication accuracy. In addition, the image quality of fingerprint images changes depending on differences in skin condition among individuals and the ambient environment such as temperature and humidity under which fingerprints are sampled. For this reason, to select images to be registered, from images sampled in advance, so as to store them in a database or the like, as well as to perform fingerprint authentication, the technique of evaluating the quality of obtained fingerprint images and selecting and registering images with high quality in advance is an effective means from the point of view of an improvement in authentication accuracy.

A conventional fingerprint collation apparatus will be described with reference to FIG. 11.

A conventional fingerprint collation apparatus 101 is comprised of a sensor unit 102 which captures a fingerprint image, an image processing unit 103 which performs image processing for the fingerprint image input from the sensor unit 102, an image quality evaluation unit 104 which evaluates the image quality of the image data input from the image processing unit 103, an image quality determination unit 105 which determines, on the basis of the evaluation result on the image quality which is input from the image quality evaluation unit 104, whether the image quality is good, and determines whether or not to store the image data input from the image processing unit 103, a registration image storage unit 106 which stores the image data input from the image quality determination unit 105, a check image storage unit 108 which stores check fingerprint image data for authentication, and an image collation unit 107 which compares/collates the registration fingerprint image data stored in the registration image storage unit 106 with the check fingerprint image data stored in the check image storage unit 108, and output the result.

In the fingerprint collation apparatus 101, a technique of determining image quality by using the number of characteristic points (minutiae) in fingerprint patterns such as end points or branch points has been reported as a technique of evaluation and determination on image quality which are performed by the image quality evaluation unit 104 and image quality determination unit 105 (for example, Japanese Patent Laid-Open Nos. 8-129644 and 8-263658).

In addition, a technique has been reported, which performs determination on image quality by using contrast information such as the proportion of black pixels in a fingerprint image or the level differences between the bright and dark portions of the fingerprint image (for example, Japanese Patent Laid-Open Nos. 8-110949 and 2000-222556).

DISCLOSURE OF INVENTION

The present invention has been made to solve the above problems and challenges in the prior art, and has as its object to provide a biometric image collation apparatus and method which can obtain authentication accuracy higher than that in the prior art.

In order to achieve the above object, according to an aspect of the present invention, there is provided a biometric image collation apparatus characterized by comprising an image quality priority level decision processing unit which evaluates a magnitude of an image quality of each of a plurality of first image data formed from biometric images associated with the same target on the basis of a specific index having a relationship of a monotone function with authentication accuracy of biometric authentication, and outputs each of the first image data upon adding a priority level thereto on the basis of the evaluation result, a first image storage unit which stores each of the first image data having a priority level added thereto from the image quality priority level decision processing unit, a second image storage unit which stores second image data used for comparison/collation with the first image data, an image collation unit which compares/collates the second image data stored in the second image storage unit with the first image data stored in the first image storage unit and outputs the comparison/collation result, and a control unit which controls each of the units, wherein the control unit causes the image collation unit to compare/collate the second image data stored in the second image storage unit with the first image data stored in the first image storage unit in accordance with the priority levels, and outputs the comparison/collation result from the image collation unit.

According to another aspect of the present invention, there is provided a biometric image collation method characterized by comprising the image quality magnitude evaluation step of evaluating a magnitude of an image quality of each of a plurality of first image data formed from biometric images associated with the same target on the basis of a specific index having a relationship of a monotone function with authentication accuracy of biometric authentication, and outputting each of the first image data upon adding a priority level thereto on the basis of the evaluation result, the first image storage step of causing a first image storage unit to store each of the first image data to which a priority level is added in the image quality priority level decision step, and the collation step of comparing/collating second image data stored in advance in a second image storage unit with the first image data stored in the first image storage unit in accordance with the priority levels, and outputting the comparison/collation result.

BRIEF DESCRIPTION OF DRAWINGS

FIG. 8 is a flowchart for explaining fingerprint collation processing in the fingerprint collation apparatus shown in FIG. 7;

BEST MODE FOR CARRYING OUT THE INVENTION

Figure 1:
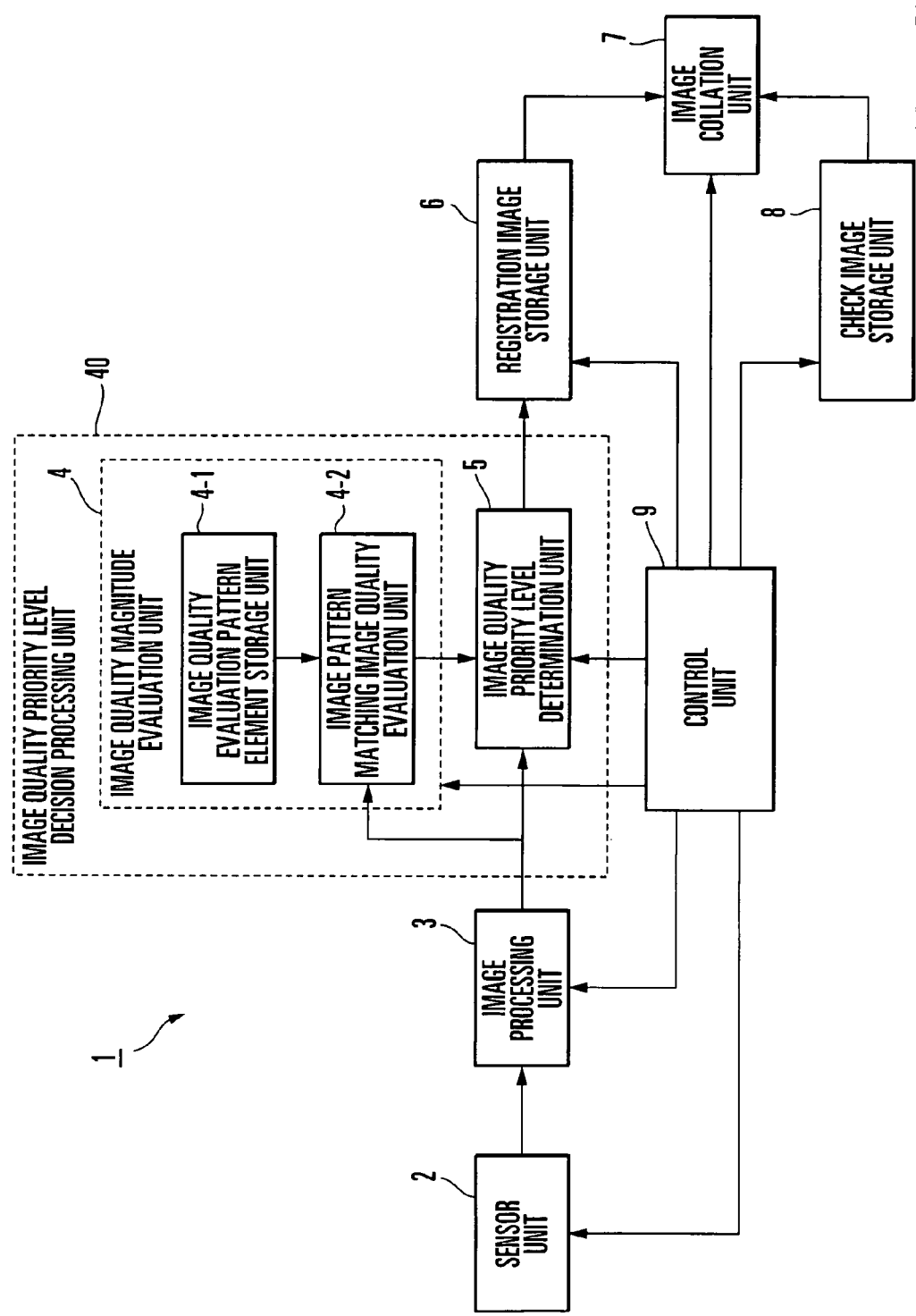
FIG. 1 is a block diagram showing an embodiment of a biometric image collation apparatus according to the present invention, and more particularly, the first embodiment in which the present invention is applied to a fingerprint collation apparatus.

The embodiments of the present invention will be described next with reference to the accompanying drawings. The following embodiments are described by exemplifying fingerprint authentication as biometric image collation. Obviously, however, the present invention can be equally applied to the collation of biometric images other than fingerprints such as irises or biometric images which are unique to living bodies and identifiably characterize them.

Note that the same reference numerals denote components having the same functions throughout the drawings for describing the embodiments, and a repetitive description thereof will be avoided.

First Embodiment

FIG. 1 shows a case wherein the present invention is applied to a fingerprint collation apparatus as a biometric image collation apparatus according to an embodiment of the present invention. A fingerprint collation apparatus 1 is comprised of a sensor unit 2 which captures a fingerprint image, an image processing unit 3 which performs image processing for the fingerprint image input from the sensor unit 2, an image quality magnitude evaluation unit 4 which evaluates the magnitude of image quality of the image data input from the image processing unit 3 and outputs the result as an image quality evaluation index, an image quality priority level determination unit 5 which stores, in a registration image storage unit 6, the image data input from the image processing unit 3 upon assigning the image a priority level including information indicating whether or not to perform collation on the basis of the image quality evaluation index input from the image quality magnitude evaluation unit 4, the registration image storage unit 6 which stores the fingerprint image data input from the image quality priority level determination unit 5, a check image storage unit 8 which stores check fingerprint image data as an authentication target, an image collation unit 7 which compares/collates the registration image data stored in the registration image storage unit 6 with the check image data stored in the check image storage unit 8 and outputs the result, and a control unit 9 which controls the operation of each of the above components.

In the above arrangement, the image quality magnitude evaluation unit 4 and priority level determination unit 5 constitute an image quality priority level decision processing unit 40, which receives a plurality of image data having undergone image processing and sequentially sent from the image processing unit 3, determines the priority level of the image quality of each image data, and sends each image data to which the priority level is added to the image storage unit 6 on the subsequent stage. In this case, collation is equivalent to determining whether or not the image stored in the check image storage unit 8 is identical to the registration fingerprint image data stored in the registration image storage unit 6. In addition, image quality in the present invention indicates the quality represented by the index calculated by evaluating an image in association with a specific factor that determines the authentication accuracy of biometric authentication instead of the quality of an image which is represented by a comprehensive index including various factors such as density and contrast which influence authentication accuracy.

The fingerprint collation apparatus 1 described above is actually comprised of an arithmetic unit, image processing unit, and storage unit like a computer. The arithmetic unit, image processing unit, and storage unit are connected to each other through a system bus. The arithmetic unit and storage unit are connected to each other through a system bus, and the storage unit and image processing unit are connected to each other through a local bus.

The arithmetic unit implements the function of each component described above by operating these hardware resources.

The image quality magnitude evaluation unit 4 is comprised of an image quality evaluation pattern element storage unit 4-1 which stores a reference image pattern of m pixels (vertical)×n pixels (horizontal) (where m and n are integers), and an image pattern matching image quality evaluation unit 4-2 which detects the number of matches between the image data input from the image processing unit 3 and the reference image pattern elements stored in the image quality evaluation pattern element storage unit 4-1 by an image pattern matching technique, and outputs the number of matches as an index for image quality evaluation. More specifically, the image pattern matching image quality evaluation unit 4-2 performs scanning operation of superimposing a stored reference image pattern element on the image data while spatially shifting the element, detects a point where a black pixel pattern in the reference image pattern element coincides with a black pixel pattern in the input image data, and finally outputs the number of coincidence points obtained by scanning the entire image data or a preset range.

The number of coincidence points is sent to the image quality priority level determination unit 5, and the image data input from the image processing unit 3 is stored in the registration image storage unit 6 upon assigning it a priority level on the basis of the image quality evaluation index input from the image quality magnitude evaluation unit 4.

The image quality priority level determination unit 5 may sequentially select input data and store them in the registration image storage unit 6. Alternatively, the image quality priority level determination unit 5 may temporarily store input image data as a plurality of registration candidates and their image quality evaluation indices, and may finally select these temporarily stored data and store them in the registration image storage unit 6 altogether. Since data as registration candidates are processed altogether, the image quality priority level determination unit 5 can temporarily store a plurality of image data and image quality evaluation indices.

The operation of the fingerprint collation apparatus 1 according to the first embodiment will be described next with reference to FIG. 2.

First of all, the sensor unit 2 captures a fingerprint image, which is a biometric image, as electronic data, and the captured fingerprint image is input to the image processing unit 3 (S201). The image processing unit 3 performs known image processing such as noise elimination and binarization for the captured fingerprint image, and the resultant image data is input to the image quality magnitude evaluation unit 4 and image quality priority level determination unit 5 (S202).

The image quality-magnitude evaluation unit 4 evaluates the image quality of the image data having undergone the image processing and input from the image processing unit 3, and outputs the result as an image quality evaluation index (S203).

Calculation of an image quality evaluation index in step S203 will be described below with reference to FIG. 3.

In the image quality magnitude evaluation unit 4, when the image data having undergone image processing by the image processing unit 3 is loaded (S301), the image pattern matching image quality evaluation unit 4-2 evaluates the image quality of the loaded image data (S302).

Assume that the index to be used for the evaluation of image quality by the image pattern matching image quality evaluation unit 4-2 is the number of specific image patterns caused in the image due to the characteristics of an image quality of interest. This number is obtained by causing the image quality evaluation pattern element storage unit 4-1 to store in advance an image pattern unique to the image quality or an image pattern forming part thereof as reference image pattern elements each comprised of m pixels (vertical)×n pixels (horizontal) and causing the image pattern matching image quality evaluation unit 4-2 to perform image pattern matching between the input image and these reference image pattern elements.

For example, pattern matching is performed by performing scanning operation of superimposing a stored reference image pattern element on input image data while spatially shifting the element, detecting a point where a black pixel pattern in the reference image pattern element coincides with a black pixel pattern in the input image data, and finally calculating the number of coincidence points obtained by scanning the reference image pattern element with respect to the entire image data or a preset range.

A plurality of reference image pattern elements may be prepared. In this case, the number of matches between all the reference image pattern elements and loaded image data is evaluated (S303), and the sum total of matches associated with all the reference image pattern elements is obtained (S304). This total sum is used as an image quality evaluation index for the image quality of interest.

Assume that image quality is a characteristic that influences a fingerprint pattern, and authentication accuracy changes depending on the image quality of interest. In this case, an image quality evaluation index uniquely associated with the magnitude of authentication accuracy can be calculated by this technique of directly detecting the number of patterns caused by the image quality and setting the number as an image quality evaluation index. This image quality evaluation index has the relationship of an increasing function or decreasing function, i.e., a monotone function, with authentication accuracy. For example, with a larger image quality evaluation index, i.e., a larger number of reference image pattern elements detected, it can be determined that the authentication accuracy is poor. For a case wherein there are different image qualities as evaluation targets, a plurality of sets of image evaluation pattern elements to be stored in advance may be prepared. It suffices if the above image quality evaluation index has the relationship of a monotone function with authentication accuracy. An image quality evaluation index may be calculated from one of a plurality of factors influencing image quality which influences authentication accuracy or may be calculated from a plurality of factors which influence authentication accuracy.

Figure 4:
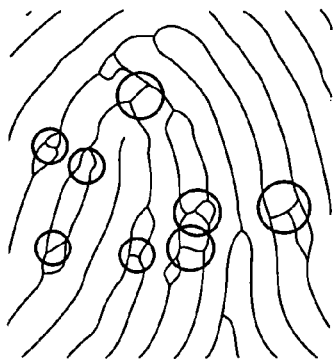
FIG. 4 is a view showing a fingerprint image to explain processing, of image quality evaluation processing in the image quality magnitude evaluation unit shown in FIG. 1, which is to be done when there is image collapse in a fingerprint image in particular.

Image quality based on the consideration of fingerprint image collapse will be described below with reference to FIG. 4. The image shown in FIG. 4 is a fingerprint image obtained by thinning a fingerprint pattern used as a registration image for template matching collation. Referring to FIG. 4, the ridge and valley lines of the fingerprint are expressed in black and white, respectively. When a fingerprint image collapses, adjacent ridge lines are joined and cannot be clearly separated into two lines. For this reason, in a thinned image, for example, a line segment which joins two ridge lines is generated as indicated by a circle in FIG. 4. A portion where the line segment which joins these two line segments is regarded as a unique pattern caused by image collapse. In order to detect this pattern, a portion which forms this pattern is schematically expressed, and a pattern element like that shown in FIG. 5 is stored as an image pattern in the image quality evaluation pattern element storage unit 4-1.

Figure 5:
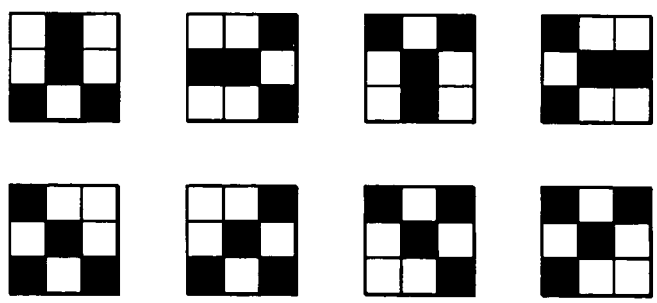
FIG. 5 is a view for explaining pattern elements for detecting image patterns unique to image collapse in the fingerprint collation apparatus according to the first embodiment.

Pattern elements for detecting patterns unique to image collapse which are stored in the image quality evaluation pattern element storage unit 4-1 are not limited to those shown in FIG. 5. For example, other pattern elements having different sizes may be used.

That is, pattern elements different from the pattern elements unique to image collapse, which are shown in FIG. 5, may be defined as other pattern elements unique to image collapse, and the above evaluation may be performed on the basis of the pattern elements. In S301, the image pattern matching image quality evaluation unit 4-2 evaluates the number of matches between the loaded fingerprint image data and all the pattern elements by image pattern matching (S302), and calculates and outputs the sum total of matches as an image quality evaluation index associated with image collapse (S3003: Y, S304).

Figure 2:
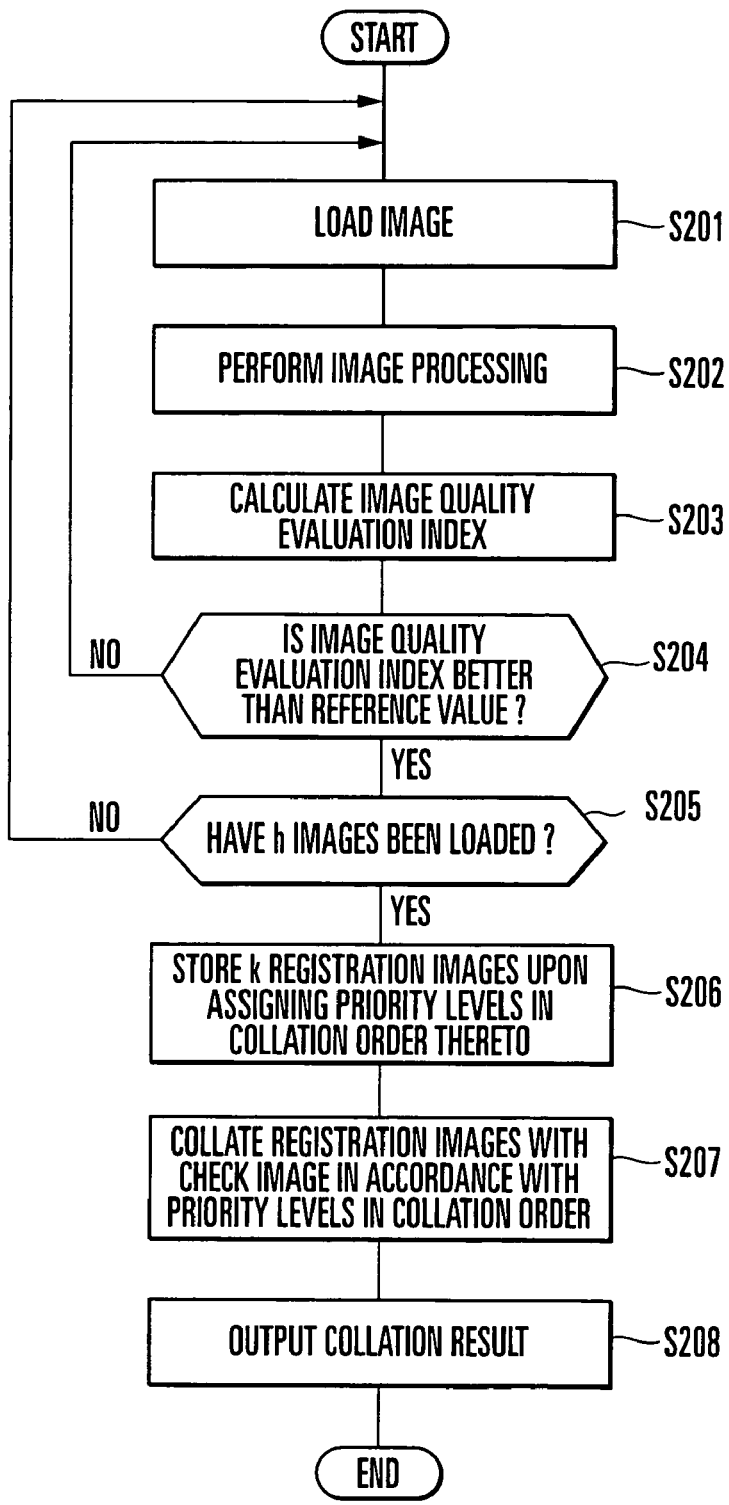
FIG. 2 is a flowchart for explaining fingerprint collation processing in the fingerprint collation apparatus shown in FIG. 1.

The flow returns to step S205 in FIG. 2. In step S205, calculation of an image quality evaluation index representing the magnitude of image quality described above (S201 to S203) is repeated by the number of times equal to the number of images (h images) to be prepared as registration candidates to acquire image quality evaluation indices for the respective images.

In this case, as indicated by the flow in FIG. 2, after calculation of image quality evaluation indices in FIG. 203 is complete, a certain threshold (reference value) may be set for the image quality evaluation indices, and indices which do not meet the threshold may be excluded in the image quality priority level determination unit 5 (S204).

The flow then returns to step S201 to evaluate the image quality of the next image data. Of a maximum h image data acquired in the above manner, the image quality priority level determination unit 5 selects a maximum of k image data in descending order of image quality evaluation indices, assigns priory levels to the image data in descending order of image quality evaluation indices, and stores them in the registration image storage unit 6.

Selection of the acquired image data and storage thereof in the registration image storage unit 6 may be sequentially performed for each image data. Alternatively, a plurality of image data as registration candidates and corresponding image quality evaluation indices may be temporarily stored, and selection and storage may be done simultaneously with respect to these temporarily stored data.

Figure 3:
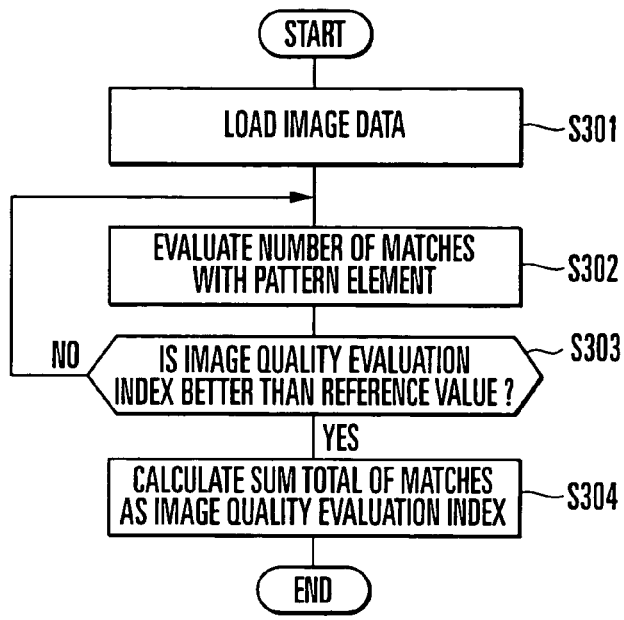
FIG. 3 is a flowchart for explaining image quality evaluation processing in an image quality magnitude evaluation unit shown in FIG. 1.
Figure 6:
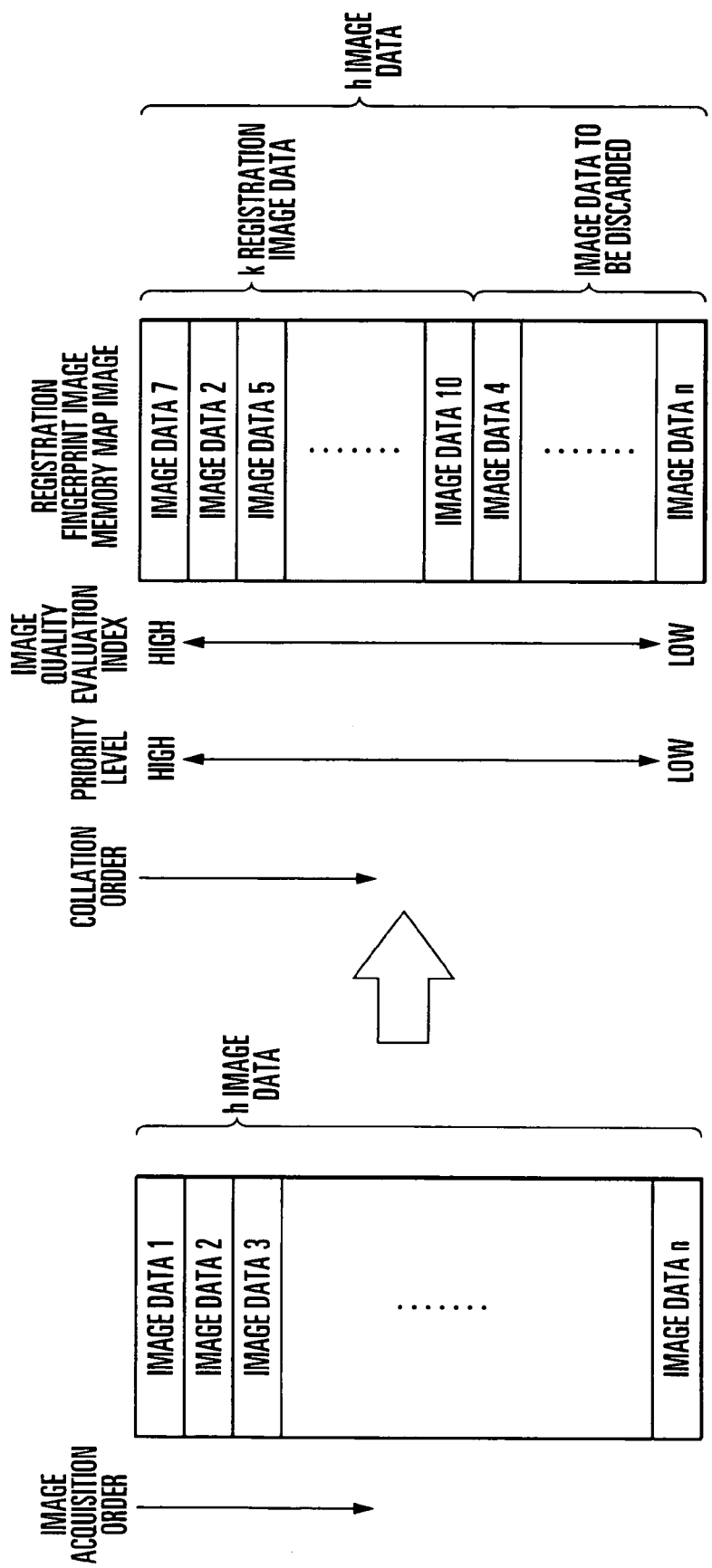
FIG. 6 is a view showing an example of how image data are stored in a first image storage unit in the fingerprint collation apparatus according to the first embodiment.

An example of processing to be performed by the image quality priority level determination unit 5 when the image quality evaluation shown in FIG. 3 is performed with respect to image collapse of a fingerprint image as an image quality evaluation target in the flow shown in FIG. 2 will be described with reference to FIG. 6. As the number of image-collapsed portions increases, authentication accuracy deteriorates. Therefore, as the image quality evaluation index represented by the number of image-collapsed portions detected increases, authentication accuracy deteriorates.

As an image quality evaluation index (image collapse evaluation index) associated with image collapse decreases, it is expected that image quality and authentication accuracy will increase, and hence a high priority level associated with the collation order is set. In contrast to this, as the index increases, it is expected that image quality and authentication accuracy will decrease, and hence a priority level in the collation order is set low (S206).

In this manner, the increasing/decreasing direction of image quality is determined by image quality characteristics. In this case, since attention is focused on image collapse, image quality increases as an image quality evaluation index decreases, and vice versa.

Assume that comparison with image data as an evaluation target is made by the image pattern matching technique. In this case, using a unique pattern element for each image quality of interest to detect a pattern originating from an image quality of interest makes it possible to perform different kinds of evaluation for the respective image qualities of interest. In addition, when the image pattern matching technique of performing direct comparison/collation of a fingerprint pattern is used to detect a portion where an image quality of interest influences a fingerprint pattern, the influence of the image quality on collation accuracy can be accurately evaluated, in particular.

In the operation flow shown in FIG. 2, (h-k) image data of the images captured by the sensor unit 2 as registration image candidates are discarded because it is assumed that they are low in image quality and authentication accuracy. By using this image quality evaluation technique in this manner, images expected to be high in image quality and authentication accuracy can be selected from the images (h images) as registration candidates in accordance with the number (k) of images required for registration, and can be registered. The image selection method using this image quality evaluation can always obtain an authentication result with higher authentication accuracy and at a higher speed.

Second Embodiment

Figure 7:
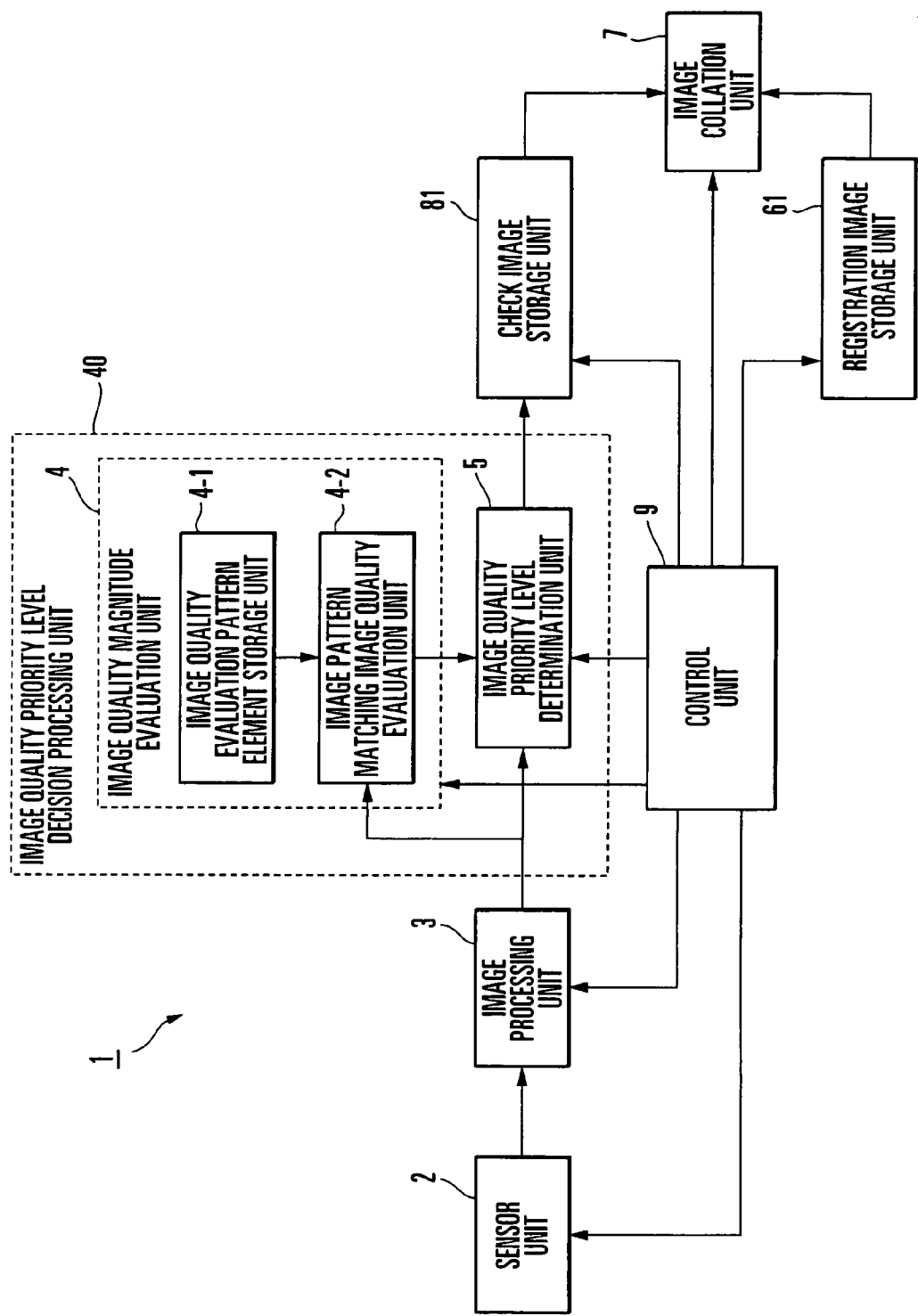
FIG. 7 is a block diagram for explaining a biometric image collation apparatus according to the second embodiment.

FIG. 7 shows a modification of the first embodiment, in which an output from an image quality priority level determination unit 5 forming part of an image quality priority level decision processing unit 40 is stored in a check image storage unit 81 (step 206' in FIG. 8). In this case, fingerprint image data as a reference is stored in a registration image storage unit 61 in advance.

In the second embodiment, if a predetermined image cannot be obtained in the image quality priority level determination unit 5 or the number of image data with predetermined priority levels cannot be obtained, a lamp 91 may be turned on to display that fingerprint images are being read, while a plurality of fingerprint image data are loaded under the control of a control unit 9.

In this case, a plurality of image data may be registered like check images, or single image data may be registered as in the prior art. The operations of the remaining components are the same as those in the first embodiment, and hence a detailed description thereof will be omitted.

Third Embodiment

The third embodiment of the biometric image collation apparatus according to the present invention will be described with reference to FIGS. 9 to 12. In the first embodiment, an image quality magnitude evaluation index is represented by the number of unique image pattern elements generated in images originating from the characteristics of an image quality of interest. However, this numerical value depends on the number of pixels of image data as an evaluation target as well as an image quality. In the third embodiment described below, a more accurate index is obtained in association with an image quality by calculating an index by using the number of pixels of image data subjected to image quality evaluation in addition to the number of image quality evaluation pattern elements detected.

In collation, an image collation unit 7 compares/collates registration images with the check image stored in a check image storage unit 8 in accordance with priority levels in the collation order to determine whether the check image is identical to any one of the registration images (S207), and outputs the result as a collation result (S208).

Figure 9:
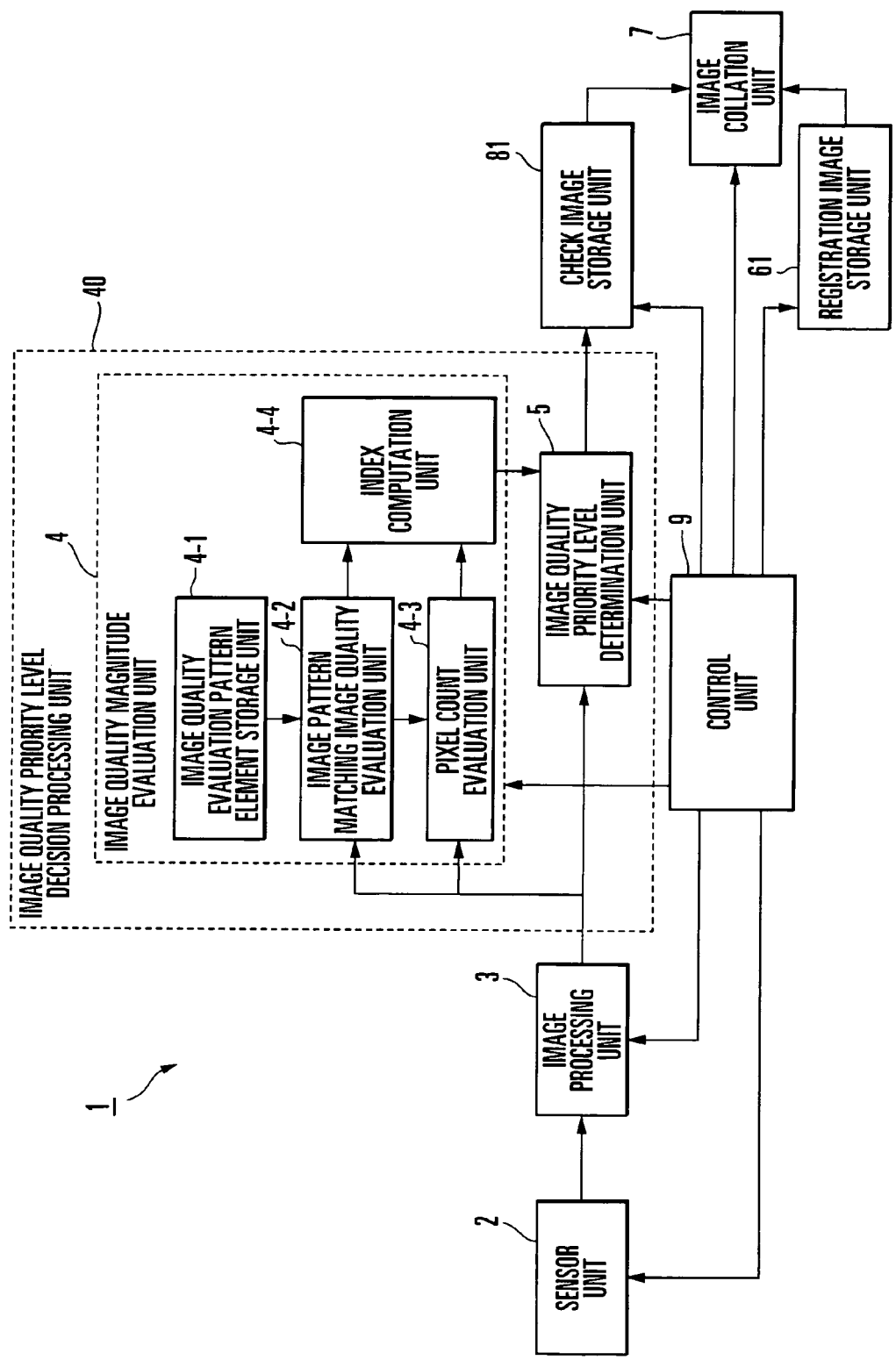
FIG. 9 is a block diagram for explaining a fingerprint collation apparatus according to the third embodiment.

FIG. 9 shows the third embodiment of a fingerprint collation apparatus 1 according to the present invention. The third embodiment differs from the first embodiment in the arrangement of an image quality magnitude evaluation unit 4. In addition to the image quality evaluation pattern element storage unit 4-1 and image pattern matching image quality evaluation unit 4-2 in the image quality magnitude evaluation unit 4 of the first embodiment, the image quality magnitude evaluation unit 4 of the third embodiment includes a pixel count evaluation unit 4-3 which obtains the number of pixels of the image data input from an image processing unit 3 and outputs the numerical value result, and an index computation unit 4-4 which performs an arithmetical operation of the numerical values output from the image pattern matching image quality evaluation unit 4-2 and pixel count evaluation unit 4-3, and outputs the result as an image quality evaluation index. The index computation unit 4-4 outputs, for example, the result obtained by performing division of the numerical values input from the image pattern matching image quality evaluation unit 4-2 and pixel count evaluation unit 4-3 as an image quality evaluation index.

Figure 10:
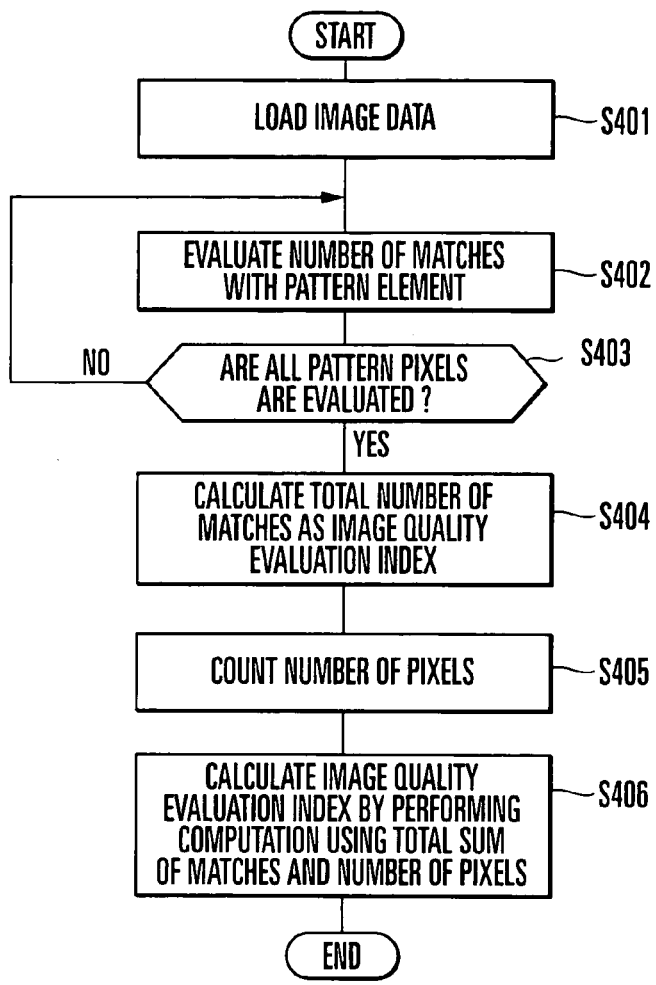
FIG. 10 is a flowchart for explaining image quality evaluation processing in the fingerprint collation apparatus according to the third embodiment.

The operation of the fingerprint collation apparatus 1 according to the third embodiment will be described next. The flow of collation operation is the same as the flow in the first embodiment shown in FIG. 2, and the flow of calculation of an image quality evaluation index is different from that in FIG. 3. FIG. 10 shows the flow of calculation of an image quality evaluation index.

First of all, image data having undergone image processing is loaded by the image processing unit 3 (S401). The image pattern matching image quality evaluation unit 4-2 then evaluates the image quality of the loaded image data (S402). In evaluating this image quality, if there are a plurality of reference image pattern elements, the number of matches between all the pattern elements and the loaded image data is evaluated (S403).

The sum total of matches associated with all the reference image pattern elements is obtained (S404). Thereafter, the number of pixels of the loaded image is calculated (S405). The result obtained by dividing the number of matches with all the pattern elements by the number of pixels is calculated as an image quality evaluation index, and the calculation result is output (S406).

Figure 11:
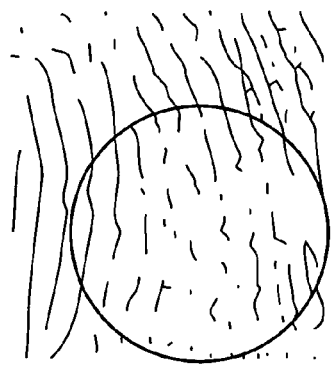
FIG. 11 is a view showing an image obtained by thinning a fingerprint pattern to explain a fingerprint image with blur.
Figure 12:
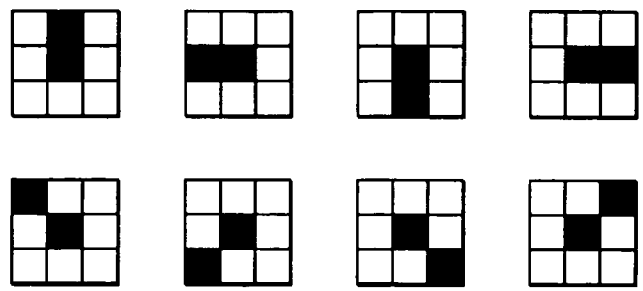
FIG. 12 is a view for explaining pattern elements for detecting image patterns unique to blurring in the fingerprint collation apparatus according to the second embodiment.
Figure 13:
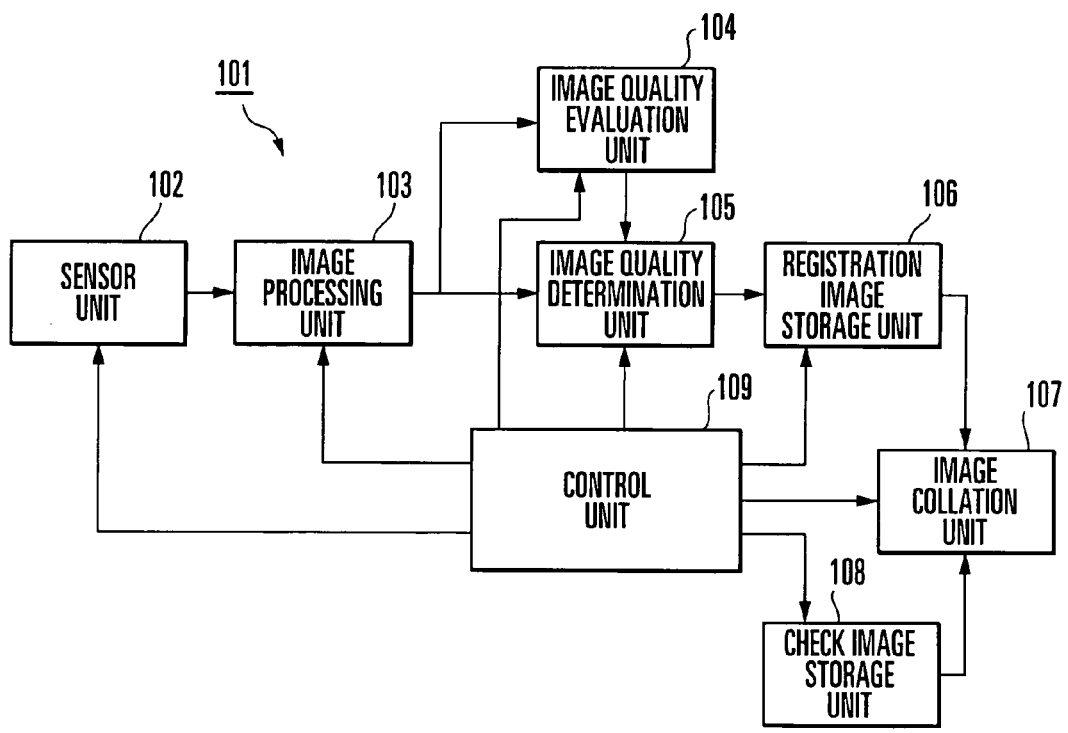
FIG. 13 is a block diagram for explaining a conventional fingerprint collation apparatus.

A case wherein an image quality is based on consideration of blurring of a fingerprint image will be described below. FIG. 11 shows an example of a blurred fingerprint image. When a fingerprint image is blurred, many fragments of ridge lines are generated as indicated by the circle in FIG. 11. These short line segments are therefore regarded as a unique pattern originating from blurring, and pattern elements like those shown in FIG. 12 are stored in the image quality evaluation pattern element storage unit 4-1 to detect such a pattern. Pixel patterns for detecting such a pattern unique to blurring are not limited to these patterns. For example, other pattern elements having different sizes may be used.

As in the case wherein image collapse is taken into consideration in the first embodiment, the image pattern matching image quality evaluation unit 4-2 evaluates the number of matches between input fingerprint image data as registration candidates and all these reference image pattern elements by the image pattern matching technique (S402), and outputs the numerical value result. Thereafter, the number of pixels of the loaded image data is counted (S405), and the number of pixels is divided by the sum total of matches (S406). The division result is then set as an evaluation index. The subsequent collation sequence is the same as in the flow shown in FIG. 2. In S406 described above, the total sum of matches may be divided by the number of pixels, and the division result may be set as an evaluation index.

In the third embodiment, the number of pixels is counted after the number of matches with the pattern elements is evaluated. However, these operations may be done in the reverse order. That is, the sum total of matches may be calculated after the number of pixels is counted.

The effects of the image quality evaluation technique in the third embodiment will be described below. Assume that loaded fingerprint images respectively have a pixel count Na and pixel count Nb (Nb<Na), and in similar blurred states. In this case, pattern elements unique to blurring appear with the same probability. Letting α be this probability, the numbers of patterns unique to blurring are represented by αNa and αNb, respectively. There is a difference between these two numbers of patterns as indicated by equation (1):

$$\alpha Na - \alpha Nb = \alpha(Na - Nb) = \alpha \Delta N \quad (1)$$

(for ΔN=Na−Nb)

If the obtained numbers of matches with pattern elements are used as evaluation values without any change, there is a difference between evaluation values with respect to the images in the same blurred state. This difference depends on the difference (ΔN) between the numbers of pixels, and hence can be neglected if variations in pixel count are small between loaded images. If, however, variations in pixel count are large, the difference becomes noticeable.

As in the above image quality evaluation technique, if the numbers of matches with pattern elements are respectively divided by the numbers of pixels of the loaded images, the two appearance probabilities coincide with each other at α. By dividing the number of matches with pattern elements by the number of pixels of an image, the appearance probability of patterns unique to an image quality of interest which does not depend on the number of pixels of the loaded image can be extracted and used as an image quality evaluation value. By using the image quality evaluation technique in the third embodiment in this manner, even with large variations in the number of pixels of a loaded image, the image quality can be accurately evaluated without being influenced by the variations.

The above third embodiment has exemplified the case wherein the index computation unit 4-4 of the image quality magnitude evaluation unit 4 performs division of the numerical values input from the image pattern matching image quality evaluation unit 4-2 and pixel count evaluation unit 4-3. However, a multiplication result may be output as an image quality evaluation index.

According to an operation flow in this case, when an evaluation index is to be calculated in step S406 of FIG. 10 from the sum total of matches obtained in step S404 and the number of pixels obtained in step S405, the number of matches with all the reference image pattern elements is multiplied by the number of pixels, and the result is output as an image quality evaluation index.

The effects obtained when an image quality evaluation index is obtained by multiplying the numerical values input from the image pattern matching image quality evaluation unit 4-2 and pixel count evaluation unit 4-3 will be described below.

A case wherein an image quality is based on consideration of blurring of a fingerprint image will be described below. Assume that almost similar numbers of matches with pattern elements are obtained in spite of the fact that loaded fingerprint images have pixel count Na and pixel count Nb (Na>Nb), respectively, and are in different blurred states. In this case, letting α be the probability that patterns unique to blurring of the image with Na appear, and β be the probability associated with Nb, the relationship represented by the following expression holds:

$$\alpha Na = \beta Nb, \quad \alpha < \beta \quad (2)$$

When the number of matches with pattern elements obtained in this case is used as an evaluation value without any change, the images cannot be discriminated from each other in spite of the fact that the images are in the different blurred states. In this case, when the numbers of pixels are respectively multiplied by the numbers of matches with pattern elements, the relationship represented by inequality (3) holds:

$$\alpha Na^2 > \beta Nb^2 \quad (3)$$

This makes it possible to discriminate the two images. With the use of this evaluation technique, when the probabilities (α and β) that patterns unique to blurring appear are close in value to each other, in particularly, evaluation can be done with more emphasis placed on the difference by multiplying the probabilities by the squares of the numbers of pixels.

In this case, however, as blurring decreases, the image quality evaluation value increases unlike the case wherein an image quality evaluation value is calculated by division. For this reason, when an image quality evaluation value is large, the image quality priority level determination unit 5 determines that image quality is high and higher authentication accuracy can be obtained, and performs image selection.

The above third embodiment has exemplified the case wherein the index computation unit 4-4 of the image quality magnitude evaluation unit 4 performs division of the numerical values input from the image pattern matching image quality evaluation unit 4-2 and pixel count evaluation unit 4-3. However, a subtraction result may be output as an image quality evaluation index.

According to an operation flow in this case, when an evaluation index is to be calculated in step S406 of FIG. 10 from the sum total of matches obtained in step S404 and the number of pixels obtained in step S405, the result obtained by subtracting the number of matches with all pattern elements from the number of pixels is output as an image quality evaluation index. Alternatively, in this flow, the result obtained by subtracting the number of pixels from the number of matches with all reference image pattern elements may be output as an image quality evaluation index.

The effects obtained when an image quality evaluation index is obtained by subtracting the numerical values input from the image pattern matching image quality evaluation unit 4-2 and pixel count evaluation unit 4-3 from each other will be described below.

A case wherein an image quality is based on consideration of blurring of a fingerprint image will be described below. Letting N be the number of pixels of a loaded image, and $\alpha$ be the probability that patterns unique to blurring of this image appear, the obtained number of matches with pattern elements is represented by $$\alpha N \quad (4)$$

In this case, if the number of matches with pattern elements is subtracted from the number of pixels as in the above image quality evaluation technique, the relationship represented by equation (5) holds:

$$N - \alpha N = (1\alpha)N \quad (5)$$

In this case, $(1-\alpha)$ represents the probability that pattern elements unique to blurring of this image do not appear. According to equation (5), the number of pixels which are not blurred is calculated by multiplying this probability by the number of pixels. That is, with the use of this evaluation technique, the number of portions where no blurring is detected in the fingerprint image, i.e., the number of portions which are not blurred, can be used as an image quality evaluation index. In this case, as in the above case of multiplication, when the image quality index is large, the image quality priority level determination unit 5 determines that image quality is high and higher authentication accuracy can be obtained, and performs image selection.

The above third embodiment has exemplified the case wherein the index computation unit 4-4 of the image quality magnitude evaluation unit 4 performs division of the numerical values input from the image pattern matching image quality evaluation unit 4-2 and pixel count evaluation unit 4-3. However, an addition result may be output as an image quality evaluation index.

According to an operation flow in this case, when an evaluation index is to be calculated in step S406 of FIG. 10 from the sum total of matches obtained in step S404 and the number of pixels obtained in step S405, the result obtained by adding the number of matches with all reference image pattern elements to the number of pixels is output as an image quality evaluation index.

The effects obtained when an image quality evaluation index is obtained by adding the numerical values input from the image pattern matching image quality evaluation unit 4-2 and pixel count evaluation unit 4-3 to each other will be described below.

A case wherein an image quality is based on consideration of blurring of a fingerprint image will be described below. Assume that almost similar numbers of matches with pattern elements are obtained in spite of the fact that loaded fingerprint images having pixel count Na and pixel count Nb (Na>Nb), respectively, are in different blurred states. In this case, letting $\alpha$ be the probability that patterns unique to blurring of the image with Na appear, and $\beta$ be the probability associated with Nb, the relationship represented by the following expression holds:

$$\alpha Na = \beta Nb, \alpha < \beta \quad (6)$$

When the number of matches with pattern elements obtained in this case is used as an evaluation value without any change, the images cannot be discriminated from each other in spite of the fact that the images are in the different blurred states. In this case, when the numbers of matches with pattern elements are added to the numbers of pixels, respectively, as in the above image quality evaluation technique, the relationship represented by inequality (7) holds:

$$\alpha Na + Na = (\alpha+1)Na > \beta Nb + Nb = (\beta+1)Nb \quad (7)$$

This makes it possible to discriminate the two images. With the use of this evaluation technique, when the probabilities ($\alpha$ and $\beta$) that patterns unique to blurring appear are close in value to each other, in particularly, evaluation can be done with more emphasis placed on the difference as in the case wherein the index computation unit 4-4 uses multiplication. In this case, as in the above cases of multiplication and subtraction, when an image quality evaluation value is large, the image quality priority level determination unit 5 determines that image quality is high and higher authentication accuracy can be obtained, and performs image selection.

The third embodiment described above has exemplified the case wherein the index computation unit 4-4 performs a single computation. However, the number of computations is not limited to one, and a combination of a plurality of computations may be executed.

The first, second, and third embodiments have exemplified the case wherein evaluation is performed with respect to one image quality of interest, and images to be registered are selected in accordance with the obtained image quality evaluation index. However, the number of image qualities of interest is not limited to one, and evaluation may be performed in consideration of a plurality of image qualities. Image selection may be performed by using the obtained image quality evaluation indices.

Assume that in the first, second, and third embodiments described above, the image pattern matching technique of directly comparing/collating fingerprint patterns is used as a technique of causing the image collation unit 7 to compare/collate the registration fingerprint image data stored in the registration image storage unit 6 or 61 with the check fingerprint image data stored in the check image storage unit 8 or 81 for authentication. In this case, since portions where an image quality of interest influences the collation of fingerprint patterns can be detected by the image quality evaluation technique described in the first, second, and third embodiments, the influence of the image quality on collation accuracy can be accurately evaluated, thereby realizing collation with higher accuracy.

According to the present invention, since images expected to have high authentication accuracy can be collated in decreasing order of authentication accuracy, an authentication result can be obtained more quickly with higher authentication accuracy.

What is claimed is:

1. A biometric image collation apparatus comprising:
an image quality priority level decision processing unit which evaluates a magnitude of an image quality of each of a plurality of first image data formed from biometric images associated with the same target on the basis of a specific index having a relationship of a monotone function with authentication accuracy of biometric authentication, and outputs each of the first image data upon adding a priority level thereto on the basis of the evaluation result, wherein said image quality priority level decision processing unit comprises:

an image quality magnitude evaluation unit which evaluates a magnitude of an image quality of each of the first image data and outputs the evaluation result as an image quality evaluation index, wherein said image quality magnitude evaluation unit calculates, as the evaluation index for each of the first image data, an index value indicating a degree of image collapse or bluffing of the image, further wherein said image quality magnitude evaluation unit comprises:

an image quality evaluation pattern element storage unit which stores at least one reference image pattern of m pixels (vertical)×n pixels (horizontal) (where m and n are integers) as one pattern element;

an image pattern matching image quality evaluation unit which obtains the number of data of the check image data which are identical to the reference image pattern element, and outputs the result as an image quality evaluation index, and said image quality priority level determination unit determines the priority level on the basis of the image quality evaluation index output from said image pattern matching;

a pixel count evaluation unit which obtains the number of pixels of one of the plurality of first image data and outputs the result; and an index computation unit which calculates the image quality evaluation index by performing multiplication, division, addition, or subtraction on the number of matches with the reference image pattern element which is output from said image pattern matching image quality evaluation unit and said number of pixels output from the pixel count evaluation unit and outputs the result as an image quality evaluation index; and an image quality priority level determination unit which outputs, to said first image storage unit, each of the first image data upon adding a priority level thereto on the basis of each image quality evaluation index output from said image quality magnitude evaluation unit;

a first image storage unit which stores each of the first image data having a priority level added thereto from said image quality priority level decision processing unit;

a second image storage unit which stores second image data used for comparison/collation with the first image data;

an image collation unit which compares/collates the second image data stored in said second image storage unit with the first image data stored in said first image storage unit and outputs the comparison/collation result; and a control unit which controls each of said units wherein said control unit causes said image collation unit to compare/collate the second image data stored in said second image storage unit with the first image data stored in said first image storage unit in accordance with the priority levels, and outputs the comparison/collation result from said image collation unit.

2. A biometric image collation apparatus according to claim 1, characterized in that said image quality magnitude evaluation unit calculates and outputs, as the image quality evaluation index for each of the first image data, an index value indicating a factor which degrades authentication accuracy.

3. A biometric image collation apparatus according to claim 1, characterized in that said image collation unit performs comparison/collation by an image pattern matching technique to check whether or not the first image data stored in said first image storing unit is identical to the second image data stored in said second image storage unit, and outputs the collation result.

4. A biometric image collation apparatus according to claim 1, characterized by further comprising: a sensor unit which captures a biometric image; and an image processing unit which performs image processing of the biometric image from said sensor unit, wherein a plurality of biometric images having undergone image processing in said image processing unit are input as the first image data to said image quality priority level decision processing unit.

5. A biometric image collation apparatus according to claim 1, characterized in that the first image data stored in said first image storage unit is check image data to be newly checked in the comparison/collation, and the second image data stored in said second image storage unit is reference image data representing an authentic target.

6. A biometric image collation apparatus according to claim 1, characterized in that the first image data stored in said first image storage unit is reference image data representing an authentic target, and the second image data stored in said second image storage unit is check image data to be newly checked in the comparison/collation.

7. A biometric image collation apparatus according to claim 1, characterized in that the biometric image comprises one selected from a fingerprint, an iris, and biometric image information unique to a living body which characterizes the living body.

8. A biometric image collation method comprising:

an image quality magnitude evaluation step of evaluating a magnitude of an image quality of each of a plurality of first image data formed from biometric images associated with the same target on the basis of a specific index having a relationship of a monotone function with authentication accuracy of biometric authentication, and outputting each of the first image data upon adding a priority level thereto on the basis of the evaluation result, wherein the number of matches between the image data and a reference image pattern of m pixels (vertical)×n pixels (horizontal) (where m and n are integers) is set as a match count, and the image quality (horizontal) (where m and n are integers) is set as a match count, and the image quality evaluation index is calculated by performing multiplication, division, addition, or subtraction with respect to the match count and the number of pixels, wherein in the image quality magnitude evaluation step, for each of the first image data, an index value indicating a degree of image collapse or blurring of the image is calculated as the evaluation index;

a first image storage step of causing a first image storage unit to store each of the first image data to which a priority level is added in the image quality priority level decision step; and a collation step of comparing/collating second image data stored in advance in a second image storage unit with the first image data stored in the first image storage unit in accordance with the priority levels, and outputting the comparison/collation result.

9. A biometric image collation method according to claim 8, characterized in that in the image quality magnitude evaluation step, an index value representing a factor which degrades authentication accuracy is calculated and output for each of the first image data as the image quality evaluation index.

10. A biometric image collation method according to claim 8, characterized in that in the image quality magnitude evaluation step, the image quality evaluation index is obtained by detecting, as a match count, the number of matches between the image data and a reference image pattern of m pixels (vertical)×n pixels (horizontal) (where m and n are integers).

11. A biometric image collation method according to claim 8, characterized in that in the collation step, comparison/collation is performed by an image pattern matching technique to check whether or not the first image data is identical to the second image data.

12. A biometric image collation method according to claim 8, characterized by further comprising: the image processing step of performing image processing of a biometric image captured by a sensor unit; and the step of inputting a plurality of biometric images having undergone image processing in the image processing step as the first image data to the image quality priority level decision processing unit.

13. A biometric image collation method according to claim 8, characterized in that the first image data stored in the first image storage unit is check image data to be newly checked in the comparison/collation, and the second image data stored in the second image storage unit is reference image data representing an authentic target.

14. A biometric image collation method according to claim 8, characterized in that the first image data stored in the first image storage unit is reference image data representing an authentic target, and the second image data stored in the second image storage unit is check image data to be newly checked in the comparison/collation.

15. A biometric image collation method according to claim 8, characterized in that the biometric image comprises one selected from a fingerprint, an iris, and biometric image information unique to a living body which characterizes the living body.

\* \* \* \* \*

UNITED STATES PATENT AND TRADEMARK OFFICE
CERTIFICATE OF CORRECTION

PATENT NO. : 7,673,145 B2
APPLICATION NO. : 10/515566
DATED : March 2, 2010
INVENTOR(S) : Takahiro Hatano et al.

It is certified that error appears in the above-identified patent and that said Letters Patent is hereby corrected as shown below:

In the Claims, Column 13, Claim 1, line 16, please delete "bluffing" and insert -- blurring --.

Signed and Sealed this
Twenty-sixth Day of July, 2011

David J. Kappos
*Director of the United States Patent and Trademark Office*